Patented May 12, 1942

2,282,331

UNITED STATES PATENT OFFICE 2,282,331

TRISAZO DYESTUFFS, THEIR COPPER COMPOUNDS AND THEIR MANUFACTURE

Adolf Krebser, Riehen, near Basel, and Werner Bossard, Basel, Switzerland, assignors to the firm J. R. Geigy A. G., Basel, Switzerland No Drawing. Application July 12, 1940, Serial No. 345,240. In Switzerland July 20, 1939

9 Claims. (Cl. 260—172)

It has been found that valuable copperable trisazodyestuffs are obtained by coupling tetrazo diphenyl and its substitution products only on one half side with an o-hydroxyphenyl carboxylic acid, then combining the obtained diazoazo compound with an amine or an amino sulphonic acid of the naphthalene series coupling in para-position, and containing in ortho-position to the diazotable amino group a substituent capable of forming metal complex compounds, further diazotising the amino disazo dyestuff, coupling the latter with a N-acyl-substitution product of the 2-amino-6-hydroxynaphthalene-8-sulphonic acid and converting the trisazo dyestuff, according to usual methods, in substance or on the fibre into the copper complex compounds. The new dyestuffs possess, also when coppered, substantive properties and dye green to olive shades which are distinguished by a remarkable fastness to light. If desired, the new dyestuff-copper compounds can also still be further coppered on the fibre.

The following examples illustrate the invention, the parts being by weight.

Example 1

18.4 parts of benzidine are, as usual, tetrazotised in a hydrochloric acid solution with 14 parts of sodium nitrite. The tetrazo solution is first coupled alkaline with 14.5 parts of salicylic acid and then in acetic acid medium with 25.3 parts of 1-amino-2-hydroxynaphthalene-methylether-6-sulphonic acid. The disazo dyestuff is isolated, formed into a paste with 1500 parts of water, intermixed with 7.2 parts of sodium nitrite and diazotised by rapidly adding at 10° C. 70 parts of concentrated hydrochloric acid. The diazo compound filtered off is coupled in aqueous suspension with 28.1 parts of 2-acetylamino-6-hydroxynaphthalene-8-sulphonic acid in presence of 40 parts of ammonia of 25% strength and 150 parts of pyridine. The finished dyestuff is salted out with 5% of common salt, then filtered and washed with brine of 2.5% strength.

For coppering the pressed cake of the trisazo dyestuff is dissolved in 1600 parts of water at 95° C., an aqueous solution of 25 parts of crystallised copper sulphate is added thereto and the whole is kept for 4 hours at boiling temperature. The dyestuff is filtered off and converted according to known methods into its sodium salt.

It constitutes a grey-black powder which dissolves in concentrated sulphuric acid with dull violet color and in water with olive-green coloration and dyes cotton from the neutral Glauber's salt bath of olive-green shades of remarkable fastness to light. It can be after-coppered on the fibre without substantial variation of shade. The dyestuff can also be dyed directly and coppered on the fibre.

By using instead of salicylic acid an other o-hydroxycarboxylic acid such as for example o- or m-cresotinic acid, or instead of 2-acetylamino-6-hydroxynaphthalene-8-sulphonic acid, the 2-ω-sulpho-acetylamino-, 2-maleylamino-, 2-phthaloylamino - 6 - hydroxynaphthalene-8-sulphonic acid or the carbamide of the said aminonaphtholsulphonic acid or instead of benzidine o-tolidine or dichloro-benzidine, there result dyestuffs with similar properties as they are described above.

Example 2

21.2 parts of o-tolidine are tetrazotised in usual manner and combined in a soda alkaline medium on one half side with 14.5 parts of salicylic acid. The obtained intermediate product is then coupled in acetic acid medium with 26.7 parts of 1-amino-2-naphtholethylether-6 - sulphonic acid. The thus obtained disazo dyestuff is isolated, then stirred up with 1500 parts of water, mixed with 7.2 parts of sodium nitrite and diazotised by rapidly adding 70 parts of concentrated hydrochloric acid at 10° C. The separated diazo body is introduced into a solution of 28.1 parts of 2-acetylamino-6-hydroxynaphthalene-8-sulphonic acid, 40 parts of ammonia of 25% strength and 150 parts of pyridine in 200 parts of water. The formation of the dyestuff being completed, the latter is salted out with 5% of common salt, whereupon the separated dyestuff is filtered off and washed with a brine of 2.5% strength.

The trisazo dyestuff is dissolved according to Example 1 in 1600 parts of hot water and treated during 4 hours with 25 parts of copper sulphate. It constitutes a grey-black powder which dissolves in concentrated sulphuric acid with a dull violet coloration and in water with an olive-green coloration. It dyes cotton olive-green shades of good fastness to light.

Example 3

30.6 parts of monoacetylbenzidine monosulphonic acid are indirectly diazotised and coupled at 0° C. in a weakly caustic soda lye alkaline medium with 13.8 parts of salicylic acid. The coupling being completed, caustic soda lye is added thereto until a concentration of 5% is reached, whereupon the mixture is heated for 30 minutes up to 99° C. The dyestuff then saponified is precipitated out at Congo-acid reaction by means of hydrochloric acid and filtered off. The pressed cakes are formed into a paste with 1000 parts of water and soda-neutral dissolved, then mixed with 7 parts of sodium nitrite, diazotised at 0° by pouring into dilute hydrochloric acid and coupled afterwards with 25.3 parts of 1-amino-2-hydroxy-naphthalenemethylether-6-sulphonic acid in an acetic acid solution.

The thus obtained aminodisazodyestuff is isolated, diazotised analogously to Example 1, coupled with 34.3 parts of 2-benzoylamino-6-hydroxynaphthalene-8-sulphonic acid in presence of pyridine and ammonia and isolated in the usual manner.

The dyestuff, a dark powder, dyes cotton pure yellowish green shades, which are, however, not fast to light; by after-treating with a copper salt solution on the fibre there results a bluish-olive tint very fast to light.

By coppering according to Example 1 in substance one obtains a copper-containing dyestuff which dyes cotton bluish-olive shades of very good fastness to light.

Instead of 1-amino-2-hydroxy-naphthalenemethylether-6-sulphonic acid may be used 1-amino-2-naphthaleneoxyacetic acid.

What we claim is:

1. A process for the production of trisazo dyestuffs, comprising coupling a tetrazo compound selected from the group consisting of tetrazodiphenyl and its $CH_3$-, Cl- and $SO_3H$-substitution products on one half side with an o-hydroxyphenyl carboxylic acid, combining the obtained diazoazo compound with one member of the group consisting of aromatic amines and amino sulphonic acids of the naphthalene series coupling in para-position and containing in ortho-position to the diazotisable amino group a substituent capable of forming metal complex compounds selected from the group consisting of O.alkyl and $O.CH_2COOH$, further diazotising the obtained aminodisazo dyestuff, coupling the same with a N-acyl-substitution product of 2-amino-6-hydroxynaphthalene-8-sulphonic acid and converting the obtained trisazo dyestuff into a copper complex compound.

2. A process for the manufacture of a trisazo dyestuff, comprising tetrazotising benzidine, coupling the tetrazo solution on one half side with salicylic acid and then with 1-amino-2-hydroxynaphthalenemethylether-6-sulphonic acid, isolating the so-obtained disazo dyestuff, diazotising the same and coupling the diazo compound with 2-acetylamino-6-hydroxynaphthalene-8-sulphonic acid.

3. A process for the production of a trisazo dyestuff, comprising tetrazotising benzidine, combining the tetrazo compound on one half side with salicylic acid, coupling the so-obtained diazoazo compound with 1-amino-2-hydroxynaphthalenemethylether-6-sulphonic acid; isolating then the so-obtained disazo dyestuff, further diazotising it, and coupling the separated diazo compound with the carbamide of 2-amino-6-hydroxynaphthalene-8-sulphonic acid.

4. A process for the production of a trisazo dyestuff, comprising diazotising monoacetyl benzidine monosulphonic acid, coupling the obtained compound with salicylic acid, saponifying the acetylamino group, further diazotising the resulting product and coupling with 1-amino-2-hydroxynaphthalenemethylether-6-sulphonic acid, isolating the obtained aminodisazo dyestuff and after diazotation coupling it with 2-benzoylamino-6-hydroxynaphthalene-8-sulphonic acid.

5. The trisazodyestuffs of the general formula

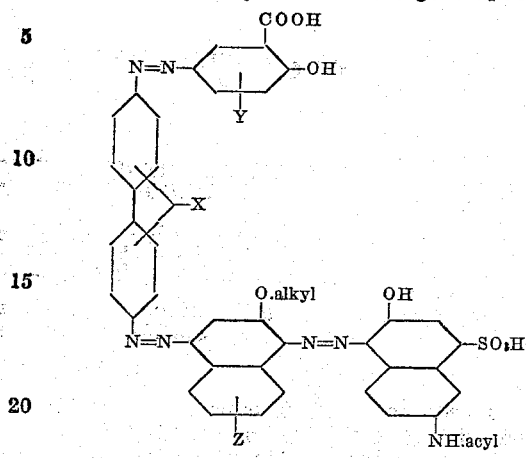

wherein X means a substituent of the group consisting of $CH_3$, Cl and $SO_3H$, Y means a substituent of the group consisting of $CH_3$ and H and Z means a substituent of the group consisting of H and $SO_3H$, dyeing when coppered cotton green to olive shades of good fastness to light.

6. The trisazodyestuffs of the general formula

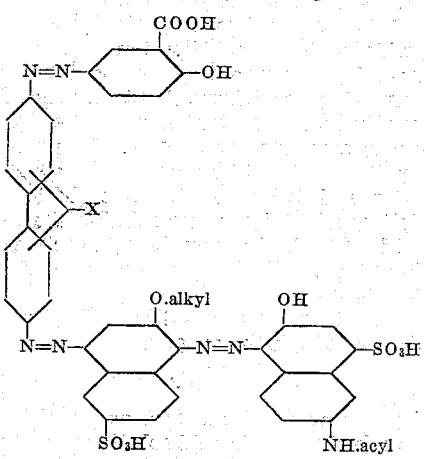

wherein X means a substituent of the group consisting of $CH_3$, Cl and $SO_3H$, dyeing when coppered cotton green to olive shades of good fastness to light.

7. The trisazodyestuff of the formula

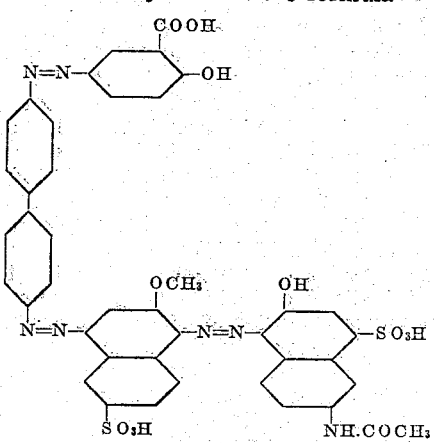

being, when coppered, in the form of the sodium salt, a grey-black powder, soluble in concentrated sulphuric acid with dull violet color and in water with olive-green color and dyeing cotton from 8. The trisazodyestuff of the formula

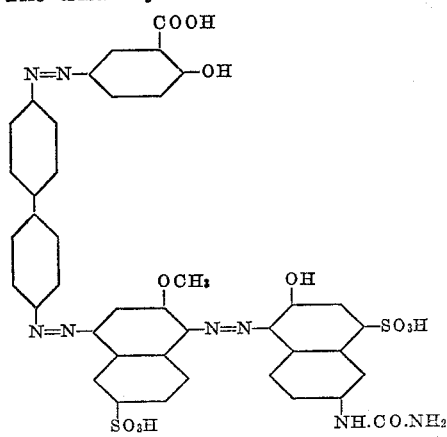

being in the form of the sodium salt a dark powder, dyeing cotton direct green shades which by coppering turn to olive-green tints of remarkable light fastness.

9. The trisazodyestuff of the formula

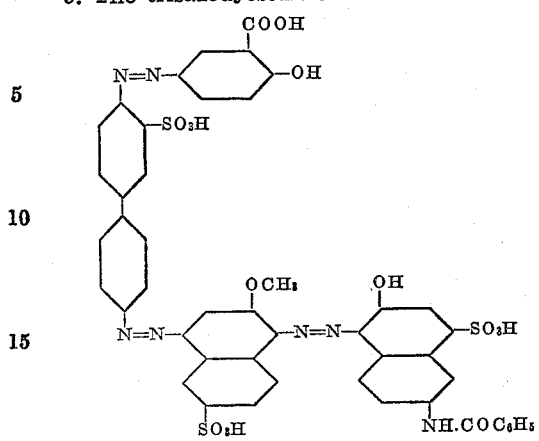

being in the form of the sodium salt a dark powder dyeing cotton pure yellowish green shades which by coppering turn to bluish-olive tints of very good fastness to light.

ADOLF KREBSER.
WERNER BOSSARD.